US012700198B1

(12) United States Patent
Pang et al.

(10) Patent No.: US 12,700,198 B1
(45) Date of Patent: Aug. 4, 2026

(54) MAKEUP BLENDING IN IMAGE GENERATION

(71) Applicant: Amazon Technologies, Inc., Seattle, WA (US)

(72) Inventors: Hui Pang, Bothell, WA (US); Sunil Sharadchandra Hadap, Dublin, CA (US); Rahul Suresh, Vancouver (CA); Amin Banitalebi Dehkordi, Vancouver (CA); Violetta Shevchenko, Adelaide (AU)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 18/755,499

(22) Filed: Jun. 26, 2024

(51) Int. Cl.
    *G06T 19/00*     (2011.01)
    *G06T 5/50*     (2006.01)
    *G06V 10/60*     (2022.01)

(52) U.S. Cl.
    CPC .............. *G06T 19/006* (2013.01); *G06T 5/50* (2013.01); *G06V 10/60* (2022.01); *G06T 2207/10024* (2013.01); *G06T 2207/20221* (2013.01); *G06T 2207/30201* (2013.01)

(58) Field of Classification Search
    None
    See application file for complete search history.

(56) References Cited

PUBLICATIONS

Li et al. (Simulating Makeup through Physics-based Manipulation of Intrinsic Image Layers, IEEE, 2015) (Year: 2015).*
Doi et al. (Spectral Estimation of Skin Color with Foundation Makeup, Springer-Verlag Berlin Heidelberg, 2005) (Year: 2005).*

* cited by examiner

*Primary Examiner* — Kyle Zhai
(74) *Attorney, Agent, or Firm* — Knobbe, Martens, Olson & Bear, LLP

(57) ABSTRACT

Systems and methods are provided for generating an image of a person's face virtually wearing a selected makeup given an input image of the face. The face image can be processed to decompose aspects of the person's face, such as shading, highlighting, boundaries, and color of the face. In order to estimate the resulting color of the face wearing makeup, the systems and methods may estimate reflectance of the skin in the face image and of the selected makeup. The resulting color of the face wearing the makeup may be estimated using reflectance of both the skin and makeup color. Then, the resulting image can be reconstructed from the decomposed aspects of the person's face by incorporating the shading and highlighting of the face with the estimated resulting color within the boundaries of the face. The result is a realistic image of the person virtually wearing the selected makeup.

20 Claims, 6 Drawing Sheets

COLOR BLENDING SYSTEM 106

PROCESSING UNIT 602

NETWORK INTERFACE 604

COMPUTER READABLE MEDIUM 606

INPUT/OUTPUT DEVICE INTERFACE 608

MEMORY 610

BROWSER/APPLICATION 612

OPERATING SYSTEM 614

MAKEUP OPTICAL PROPERTIES ESTIMATOR COMPONENT 108

FACE ANALYSIS COMPONENT 110

COLOR BLENDING COMPONENT 112

IMAGE RECONSTRUCTION COMPONENT 114

MAKEUP BLENDING IN IMAGE GENERATION

BACKGROUND

Many approaches to virtual try-on of clothes, makeup or other products exist. Some of these approaches may include machine learning models or physics-based methods. Machine learning models, such as neural network models and generative artificial intelligence techniques, can be trained or prompted to synthesize various types of content based on training data. Physics-based methods typically build virtual try-on functionality utilizing physics rules.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 provides a graphical representation of steps in a process of computing makeup reflectance based on various makeup properties.

DETAILED DESCRIPTION

Figure 1:
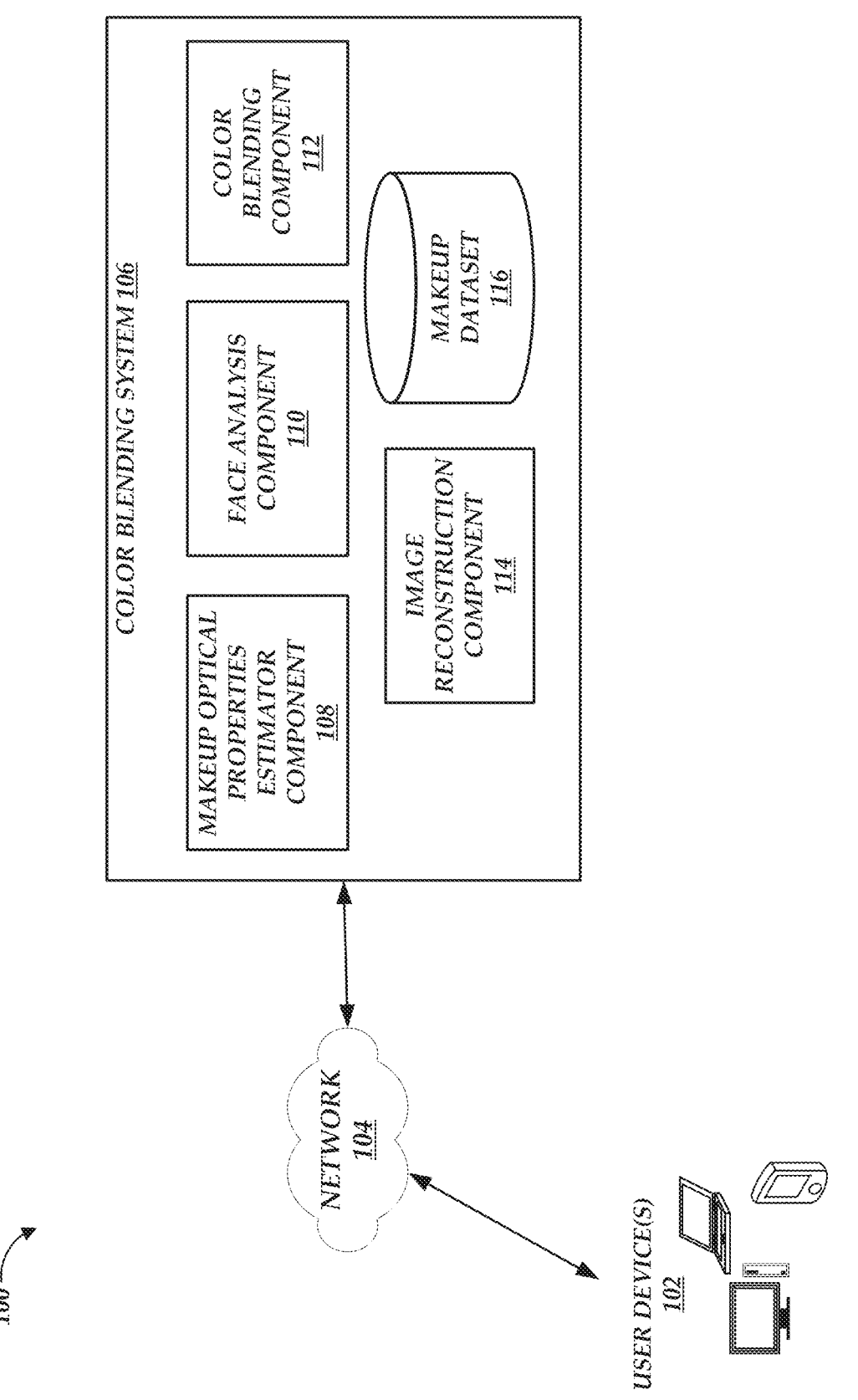
FIG. 1 is a block diagram depicting an illustrative environment in which components of a color blending system can generate images depicting a person's face wearing a selected makeup.

Generally described, aspects of the present disclosure relate to a color blending computing system that can take values representing the reflectance of a person's skin and the reflectance of a makeup and blend them to use in generating an image of the person wearing the makeup. In particular, the makeup may be foundation or other types of makeup, such as blush, bronzer, eyeshadow, and the like. The system may receive an input image depicting a person's face upon which the makeup will be virtually applied. An end user may have the option of selecting a particular makeup and makeup shade, along with a thickness with which to apply the makeup. The system may obtain various properties of the selected makeup from a datastore and estimate a reflectance of the makeup from the makeup properties. The system may also estimate a makeup transmittance from the selected thickness with which to apply the makeup. The system can process the input image to deconstruct the face in the image into various layers, including an albedo layer, a shading layer, and a highlight layer, along with a semantic segmentation mask. From the albedo layer, the system can estimate a skin reflectance. Using the makeup reflectance, makeup transmittance, and skin reflectance, the system can estimate a reflectance of the makeup laid on top of the skin in order to estimate what color the makeup blended with the skin may look like. The system may generate a blended albedo image using the estimated blended reflectance. The system may then create a resulting image depicting the face in the input image as wearing the makeup by reconstructing the image with the blended albedo image, the shading layer, the highlight layer, and the face semantic segmentation mask.

Currently, existing systems employ a variety of techniques to approach virtual try-on with makeup and foundation. Some of these techniques may include physically-based rendering, makeup transfer, neural networks, among others. Current methods could also include Alpha blending which uses red green blue (RGB) color values. However, for foundation in particular, which is more transparent than other makeup categories, makeup virtual try on can easily look fake if the technique or color does not blend well with the skin color. In addition, some of these methods, such as neural networks, may also suffer from bias where the method is reliant on training data that has does not contain adequate data for particular skin tones. Current methods have also overlooked the differences in behavior between light and the color of pigment. For example, if yellow and blue light are mixed together, gray light results. However, if yellow and blue paint color are mixed together, green color results. Therefore, when the method uses a red green blue alpha (RGBA) value of the makeup to control the opacity and the beauty product is rendered on top of skin, the color blending is implemented as a linear combination and treated as colored light but not as pigments, which may not produce an accurate coloring of the makeup on skin.

Additionally, current methods implementing Kubelka-Munk Theory require multispectral measurements of reflectance in a controlled environment, and computing and storing per-wavelength absorption and scattering coefficients for the implementation is quite costly. These methods also traditionally require auxiliary information, either direct measurement with an optical device, or prior optimal information about primary pigments or colors, which is not scalable or available for virtual try-on use cases.

Embodiments of the present disclosure address the above-mentioned problems by providing a makeup blending system that can generate an image of a person virtually wearing a selected makeup by blending the makeup with the skin using the reflectance of the makeup and the skin. Reflectance may define the perceived color of the makeup or skin. The system may estimate the blended reflectance using the Kubelka-Munk Theory, along with Taylor's Expansion. Using Taylor's Expansion, along with the Kubelka-Munk theory, for virtual try-on of makeup can significantly reduce the computational complexity of makeup virtual try-on and furthermore, save computer memory. Without utilizing Taylor's Expansion, performing makeup virtual try-on using Kubelka-Munk theory alone would require longer computation time and larger memory usage. The Taylor's Expansion approximate, described in further detail below, can also significantly reduce the storage space used for the calculations associated with virtual try-on of makeup.

Kubelka-Munk theory addresses the question of how the color of a substrate is changed by the application of a coat of paint of specified composition and thickness, and especially the thickness of paint needed to obscure the substrate. When the light hits a pigment particle, some light of specific wavelength gets absorbed, and some light gets scattered. The scattering and absorption coefficients determine the color of this pigment. When there is a layer of pigments, the light repeatedly gets absorbed and scattered from each pigment. The color that is bounced out of the surface is determined by the scattering and absorption of each pigment. For example, blue pigments absorb long wavelength color and yellow pigments absorb short wavelength color, so the final wavelength that could survive is green.

Since Kubelka-Munk theory typically applies only to the blending of albedo color, first, the system can decompose an input image to extract albedo color from the original face image. Second, the system can approximate a reflectance curve for the foundation or makeup product and for the skin. Third, the system can implement Kubelka-Munk theory to blend foundation with skin and generate a virtual try-on result based on the product material properties (e.g. finish type and coverage). To provide realistic virtual try-on experience, the system can also show foundation (a known type of makeup, sometimes referred to as makeup foundation) of different finish types and coverage level. The system can realistically apply makeup on a user's face by properly blending the makeup color with the skin color, preserving the facial features of the user (e.g., eyebrows, eyelashes, nostrils, etc.), and keep the light reflection location after applying the makeup.

This method provides a simplified linear approximation of the reflectance spectrum with three wavelengths given RBG colors and a method to estimate the absorption and scattering coefficients based on the material property of makeup products, which doesn't require optical measurement. In addition, aspects of the present disclosure approximate the Kubelka-Munk model with Taylor's Expansion to avoid multispectral data in computation and significantly improve computational efficiency and run time of the method when implemented on a computing system. Utilizing the Kubelka-Munk model with Taylor's Expansion also does not use as much storage as existing methods which need to use the full spectrum values.

Turning to the figures, FIG. 1 is a block diagram depicting an illustrative environment 100 in which components of a color blending system 106 can generate images depicting a person's face wearing a selected makeup. The color blending system 106 includes a makeup optical properties estimator component 108, a face analysis component 110, a color blending component 112, an image reconstruction component 114, and a makeup dataset 116.

The makeup optical properties estimator component 108 may be a computer implemented component that can estimate or approximate a reflectance of a selected makeup. The makeup optical properties estimator component 108 may communicate with the makeup dataset 116, which contains properties associated with makeup that is available for selection in the system. For example, the makeup dataset 116 may contain the standard red, green, blue (sRGB) value, and coverage of each of the available makeups. The makeup optical properties estimator component 108 can obtain the sRGB value and coverage of the selected makeup from the makeup dataset 116 and approximate the reflectance and transmittance curves given thickness of the makeup using values from makeup dataset.

The face analysis component 110 can receive an input image depicting a face upon which to apply the selected makeup and process the input image to decompose the image. For example, the image may be decomposed into an albedo layer, a shading layer, and a highlight layer. The face analysis component 110 may also process the image to get a semantic segmentation mask, which can depict the boundaries of the face in the input image and therefore can ensure that the final generated image places the blended makeup within the boundaries of the face (or relevant portion(s) of the face for the particular type of makeup to be virtually applied). The face analysis component 110 can also approximate reflectance of the skin in the input image using the generated albedo layer.

The color blending component 112 may use the makeup reflectance, the skin reflectance, and a makeup transmittance to estimate the reflectance of the makeup laid on top of the skin, which may depict how the makeup may look blended with the skin. The color blending component 112 may utilize the Kubelka-Munk Theory with Taylor's Expansion in order to estimate the blended reflectance, as will be further described below. The color blending component 112 may further generate a blended albedo image based on the estimated blended reflectance.

The image reconstruction component 114 may generate a final result image that depicts the face in the input face image virtually wearing the selected makeup. The image reconstruction component 114 may construct the result image using the shading layer, highlight layer, face semantic segmentation mask, and the blended albedo image. The image reconstruction component 114 may use the coloring from the blended albedo image within the boundaries of the face as depicted in the face semantic segmentation mask and add back the shading and highlight to the face using the highlight layer and shading layer. This allows the system to generate a realistic looking image of the face with the blended makeup.

User device(s) 102 (hereinafter referred to as "user device 102" for ease of reference) illustratively corresponds to any computing device that provides a means for a user to interact with the components of color blending system 106. User device 102 may include user interfaces or dashboards that connect a user with a machine, system, or device. In various implementations, user device 102 includes computer devices with a display and a mechanism for user input (e.g., mouse, keyboard, voice recognition, touch screen, and/or the like). For example, the user device 102 includes a desktop, tablet, e-reader, server, wearable device, laptop or tablet computer, smartphones, gaming consoles, personal digital assistants (PDAs), hybrid PDA/mobile phone, mobile phone, electronic book reader, set-top box, voice command device, camera, digital media player, and the like. The user device 102 can access a cloud provider network via the network 104 to view or manage their data and computing resources, as well as to use websites and/or applications hosted by the cloud provider network. Elements of the cloud provider network may also act as clients to other elements of that network. Thus, user device 102 can generally refer to any device accessing a network-accessible service as a client of that service.

The components of the color blending system 106 may be communicatively coupled via a network 104. The network 104 can include any appropriate network, including wired network, wireless network, or combination thereof. For example, network 104 may be a personal area network, local area network, wide area network, cable network, satellite network, cellular network, or any other such network or combination thereof. As a further example, the network 104 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, C-band, mmWave, sub-6 GHZ, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 104 can represent a network that may be local to a particular organization, e.g., a private or semi-private network, such as a corporate or university intranet. In some implementations, devices communicate via the network 104 without traversing an external network, such as the Internet. Devices connected via the network 104 in this case may be walled off from accessing the Internet. As an example, the network 104 may not be connected to the Internet. Accordingly, e.g., the user device 102 may communicate with color blending system 106 directly (via wired or wireless communications) or via the network 104, without using the Internet. Thus, even if the network 104 or the Internet is down, the color blending system 106 may continue to communicate and function via direct communications (and/or via the network 104).

Figure 2:
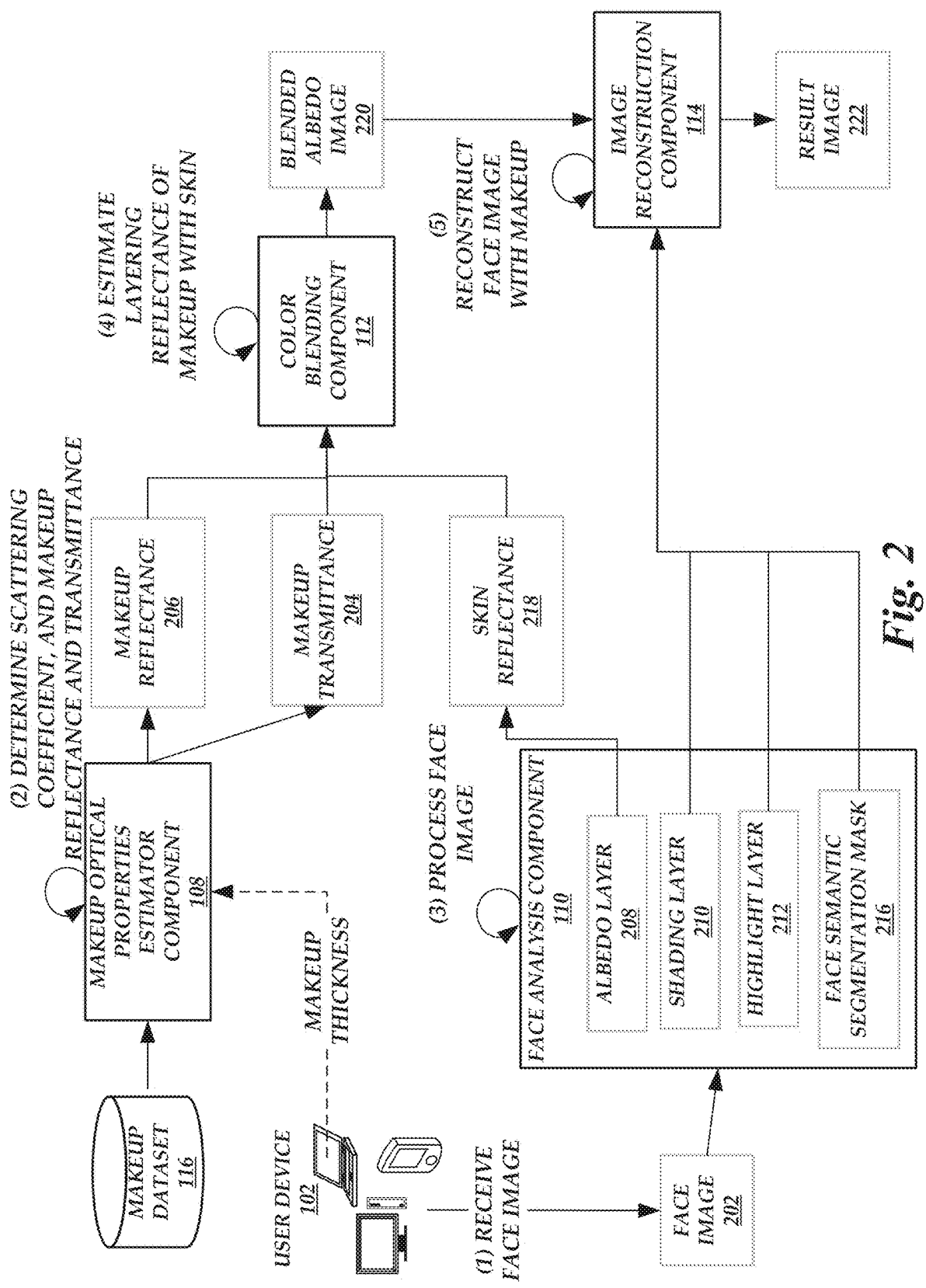
FIG. 2 depicts illustrative interactions between the components of the color blending system in order to generate images depicting a person's face wearing a desired makeup.

FIG. 2 depicts illustrative interactions between the components of the color blending system 106 in order to generate an image depicting a person's face wearing a selected makeup. First, at (1), the color blending system 106 may receive a face image 202. The face image 202 may be an image depicting the face of a person upon which to virtually apply makeup. The color blending system 106 may receive the face image 202 from the user device 102. In one embodiment, an end user may input to the color blending system 106 the face image 202 using the user device 102. For example, the end user may utilize a mobile application to take a picture of their face and send the picture to the color blending system 106 for virtual try on of makeup.

Optionally, the makeup optical properties estimator component 108 may receive a makeup thickness from the user device 102 indicating the thickness with which to apply the makeup in the resulting generated image. The makeup thickness may be selected by an end user using the user device 102. For example, the end user may be presented with a sliding bar in a virtual try on user interface to select the thickness to apply the makeup. However, this is not meant to be limiting or required. For example, in one embodiment, the makeup thickness may be a default value that is not selected by an end user but instead is preselected by the color blending system 106.

At (2), the makeup optical properties estimator component 108 may determine a scattering coefficient and makeup reflectance and transmittance. The scattering coefficient can be estimated from reflectance of a fixed thickness. In one embodiment, the scattering coefficient can be derived from the reflectance of a fixed thickness empirically based on a makeup coverage property. Accordingly, the system can estimate reflectance and transmittance of any given thickness level from the scattering coefficient. By utilizing this method, the color blending system 106 can avoid using optical tools to measure the scattering coefficient by instead approximating the scattering coefficient using the existing values available to the system. Optionally, the scattering coefficient may be estimated offline.

The makeup optical properties estimator component 108 may approximate a makeup transmittance 204 from the makeup thickness. Makeup transmittance 204 may refer to the amount of light that is transmitted through makeup. The makeup transmittance 204 may be represented a wavelength spectrum. The makeup transmittance 204 may be estimated as a function of the thickness, a wavelength dependent scattering coefficient, and a wavelength dependent absorption coefficient. The function may include a ratio of the wavelength dependent absorption coefficient and the wavelength dependent scattering coefficient. Once the transmittance is estimated, the color blending system 106 can use linear interpolation to approximate values for the full spectrum of transmittance.

The makeup optical properties estimator component 108 may determine a makeup reflectance 206 using stored properties in the makeup dataset 116 for the makeup. The makeup may be a selected makeup that an end user wishes to virtually try on. For example, the end user may use a user interface to select a desired makeup for virtual try on. In some embodiments, the selection may be made in a shopping or retail environment in which the user is viewing a user interface that provides various product details of a makeup product from a particular brand or manufacturer that the user is considered purchasing via the user interface. The makeup dataset 116 may contain the sRGB value and coverage for the selected makeup, which may be used to estimate the reflectance 206 for the selected makeup. The makeup optical properties estimator component 108 may estimate the reflectance curve with the sRBG value and coverage for various wavelengths in the spectrum. Then, the makeup optical properties estimator component 108 may use linear interpolation to get a reasonable approximation of the reflectance curve from those values. The process by which the makeup reflectance 206 is estimated will be discussed in further detail below with respect to FIG. 3.

At (3), the face analysis component 110 may process the face image 202. In processing the face image 202, the face analysis component 110 may generate an albedo layer 208, a shading layer 210, a highlight layer 212, and a face semantic segmentation mask 216. The process by which the albedo layer 208, the shading layer 210, the highlight layer 212, and the face semantic segmentation mask 216 are generated will be discussed in further detail below with respect to FIG. 4. The face analysis component 110 may additionally estimate a skin reflectance 218 which may represent a reflectance curve indicating how the color of the skin may be perceived by the human eye. The process by which the skin reflectance 218 is estimated will be discussed in further detail below with respect to FIG. 4.

At (4), the color blending component 112 may estimate the reflectance of the color of layering the selected makeup on top of the skin using the makeup transmittance 204, the makeup reflectance 206, and the skin reflectance 218. The layering reflectance of the makeup with skin may be used to generate a blended albedo image 220. The blended albedo image 220 may depict the face from the face image 202 with the color derived from the estimated layering reflectance. The color blending component 112 may utilize the Kubelka-Munk Theory with Taylor's expansion in order to estimate the layering reflectance. The reflectance spectrum represents the color as perceived by the human eye of the makeup applied on top of the skin. The layering reflectance may be estimated as a function of the makeup transmittance 204, the makeup reflectance 206, and the skin reflectance 218 for various wavelengths. For example, based on the Kubelka-Munk theory, the reflectance of two non-homogeneous layers (e.g. skin+foundation) using the Kubelka-Munk theory may be represented as:

$$R = R_C + T_C R_B T_C + T_C R_B R_C R_B T_C + \ldots \qquad \text{Formula 1}$$

$$= R_C + \frac{T_C^2 R_B}{1 - R_C R_B} \qquad \text{Formula 2}$$

where $R_c$ is the makeup reflectance 206, $R_b$ is the skin reflectance 218, and $T_c$ is the makeup transmittance 204. The resulting reflectance curve can be approximated using Taylor's Expansion to improve efficiency.

Based on the Kubelka-Munk model, the color blending component 112 may estimate the reflectance of a layer of foundation on top of skin using the reflectance of the skin, the reflectance of the foundation, and the transmittance of the foundation. However, the scattering coefficient S may affect how much skin is possible to see through the foundation. Since it is not necessary or contemplated with the present implementation to measure the scattering coefficient with an optical device, the color blending component 112 can approximate the scattering coefficient with the product's material property (e.g., coverage). The coverage may be categorized as a value between 1 and 5, indicating how opaque the product is when applied on the face (e.g., how much the makeup may cover blemishes, freckles, etc.).

The scattering coefficient can determine how fast the reflectance grows and how fast the transmittance decreases, as the thickness increases. With the same thickness of foundation, high coverage foundation should be opaquer and have more saturated color. Therefore, there is a relationship between the scattering coefficient and the coverage. Instead of modeling the scattering coefficient directly, the color blending component 112 can assume the same thickness where high coverage foundation can achieve a higher proportion of the reflectance for a fully opaque layer of makeup. Therefore, when the coverage is the same but the color of the makeup changes, the reflectance of the same thickness can change proportionally to the color of makeup. For example, the threshold may be 0.3 for full coverage, 0.2 for medium coverage, and 0.1 for light coverage. At this point, the color blending component 112 can derive the scattering coefficient. Then, using the scattering coefficient and makeup application thickness, the color blending component 112 can compute the reflectance of layering foundation on top of the skin.

In one embodiment, the color blending system 106 may convert the layering reflectance back to RGB color. To convert the spectrum from the reflectance to RGB color, the color blending system 106 can perform an integral of full visible spectrum to convert the reflectance to x, y, and z values in an XYZ color space. With Taylor's Expansion, channel Y and Z can get rid of the computationally expensive integration and directly make us of the Y and Z channels of makeup and skin color.

In one embodiment, the color blending system 106 may smooth the skin texture to reduce skin blemishes like dark spots, acne, freckles, etc. For example, the color blending system 106 may use a smoothing algorithm to achieve a natural look. The smoothing algorithm may use a bilateral filter to smooth the image while preserving edges, get high frequency details of the image, and/or use overlay blending.

The smoothing algorithm may also detect acne, blemishes, etc. with a clustering method and then can apply the smoothened blending to the detected region of those facial blemishes.

At (5), the image reconstruction component 114 may reconstruct the face image 202 with makeup to generate a result image 222. The image reconstruction component 114 may reconstruct the face image 202 by incorporating the color from the blended albedo image 220 incorporated into the area of skin depicted in the face semantic segmentation mask 216 as well as adding back in the shading layer 210 and the highlight layer 212 to show a realistic image of the face. In some embodiments, varying amounts of the highlight layer 212 may be added back to the resulting image based on the type of makeup. For example, the color blending system 106 could adjust how much highlight from the highlight layer 212 to add back based on whether the foundation is matte (e.g. minimally reflective) or dewy (e.g., highly reflective).

Figure 3:
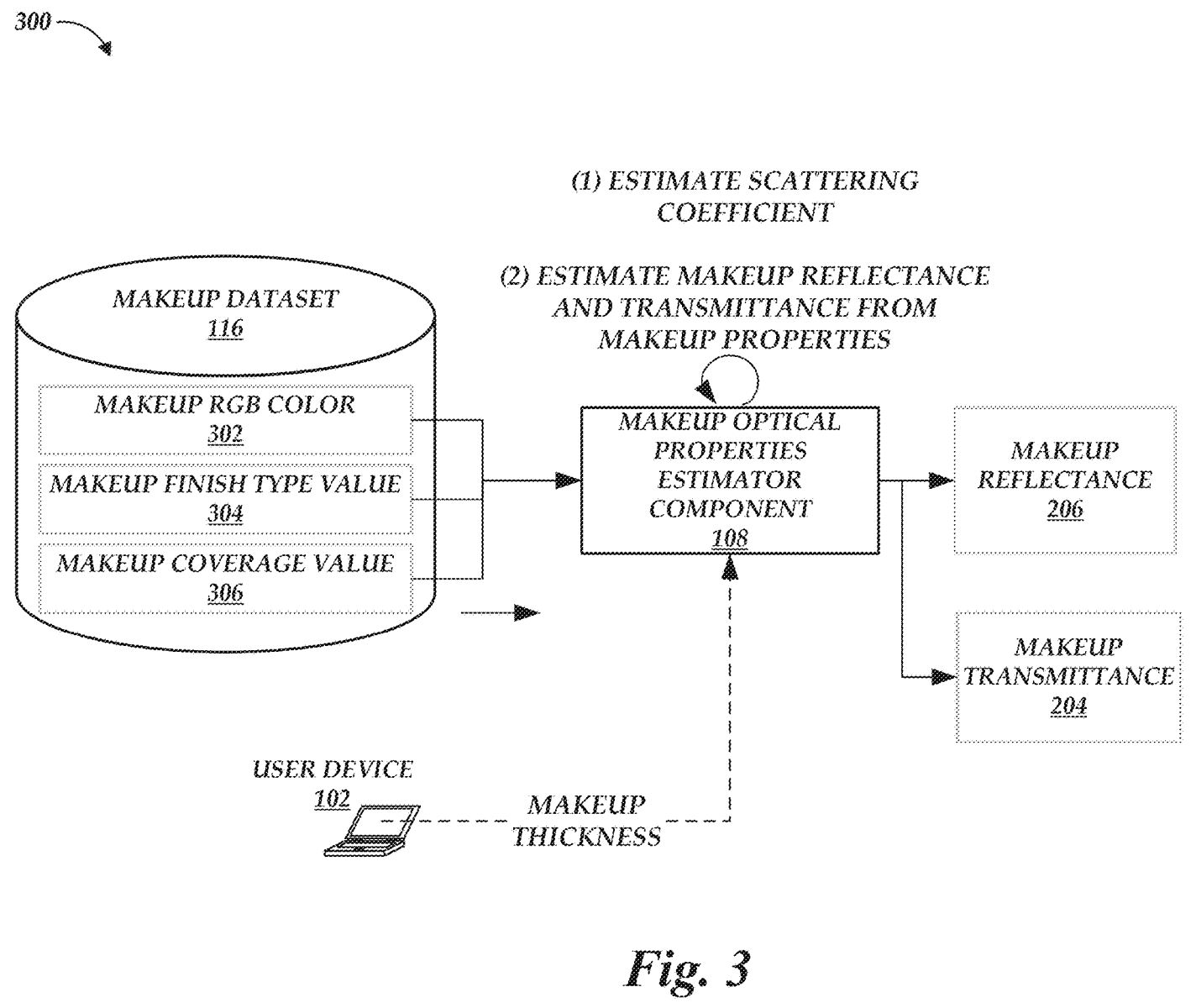

FIG. 3 provides a graphical representation 300 of steps in a process of computing a makeup reflectance 206 based on various makeup properties. The makeup optical properties estimator component 108 may receive the various makeup properties from the makeup dataset 116. In one embodiment, the makeup dataset 116 may contain information about products in an online catalog. For example, the online catalog may contain a number of makeup products, with each product containing a number of properties associated with that product. The properties may have originally been received from a manufacturer, brand, or seller of each particular makeup product, for example. Additionally, the makeup optical properties estimator component 108 may optionally receive a makeup thickness from a user device 102. The makeup optical properties estimator component 108 may receive a makeup RBG color 302, a makeup finish type value 304, and a makeup coverage value 306 from the makeup dataset 116. The makeup RBG color 302 indicates the red, blue, green values of the makeup which represent the color of the makeup. The makeup finish type value 304 indicates the amount of shine versus matte that the makeup can display when applied. The makeup coverage value 306 may indicate how much coverage the makeup may have. Coverage may indicate how opaque the makeup is and therefore, how much skin shows through the makeup. For example, the makeup coverage value 306 may indicate high coverage, medium coverage, and low coverage. From these properties, the makeup optical properties estimator component 108 can estimate the makeup reflectance 206. The makeup reflectance 206 may be a function representing a reflectance curve.

At (1) of FIG. 3, the makeup optical properties estimator component 108 can estimate a scattering coefficient. The makeup optical properties estimator component 108 can approximate the scattering coefficient with the product's material property (e.g., makeup coverage value 306). The coverage may be categorized as a value between 1 and 5, indicating how opaque the product is when applied on the face (e.g., how much the makeup may cover blemishes, freckles, etc.).

At (2) the makeup optical properties estimator component 108 can estimate makeup reflectance and transmittance from the makeup properties. To approximate the reflectance curve from the sRBG value, first the color blending system 106 can convert the sRGB value to corresponding x, y, and z values in an XYZ color space. Second, because of the smoothness of the reflectance curve, the color blending system 106 can approximate the integral with regions of quadrilateral formed by various wavelengths (2), such as the wavelength at 400 nm, 500 nm, and 600 nm. These three wavelengths may be selected based on the peaks of the human eye sensitivity spectrum. Therefore, the reflectance curve can be approximated using equations from the various wavelength values. For example, denoting the reflectance values at 400 nm, 500 nm, and 600 nm are $R_1$, $R_2$, and $R_3$ (e.g., the various reflectance values) respectively, where the reflectance curve may be approximated by the following functions:

$$\tilde{R}(\lambda) = \begin{cases} \frac{r_2 - r_1}{100}(\lambda - 400) + r_1, & 400 \leq \lambda < 500 \\ \frac{r_3 - r_2}{100}(\lambda - 500) + r_2, & 500 \leq \lambda < 600 \\ r_3, & 600 \leq \lambda \leq 700 \end{cases} \qquad \text{Formula 3}$$

Each R value may be calculated based on the color of the makeup. After getting all R values, the color blending system 106 can use linear interpolation for the values in between to get the reflectance curve representing the makeup reflectance of an opaque layer, then derive scattering coefficient based on the coverage value and makeup reflectance for any given thickness 206.

The makeup optical properties estimator component 108 may approximate a makeup transmittance 204 from the makeup thickness as described above with respect to FIG. 2. The makeup transmittance 204 may be estimated as a function of the thickness, a wavelength dependent scattering coefficient, and a wavelength dependent absorption coefficient. The function may include a ratio of the wavelength dependent absorption coefficient and the wavelength dependent scattering coefficient. Once the transmittance is estimated, the color blending system 106 can use linear interpolation to approximate values for the full spectrum of transmittance.

Figure 4:
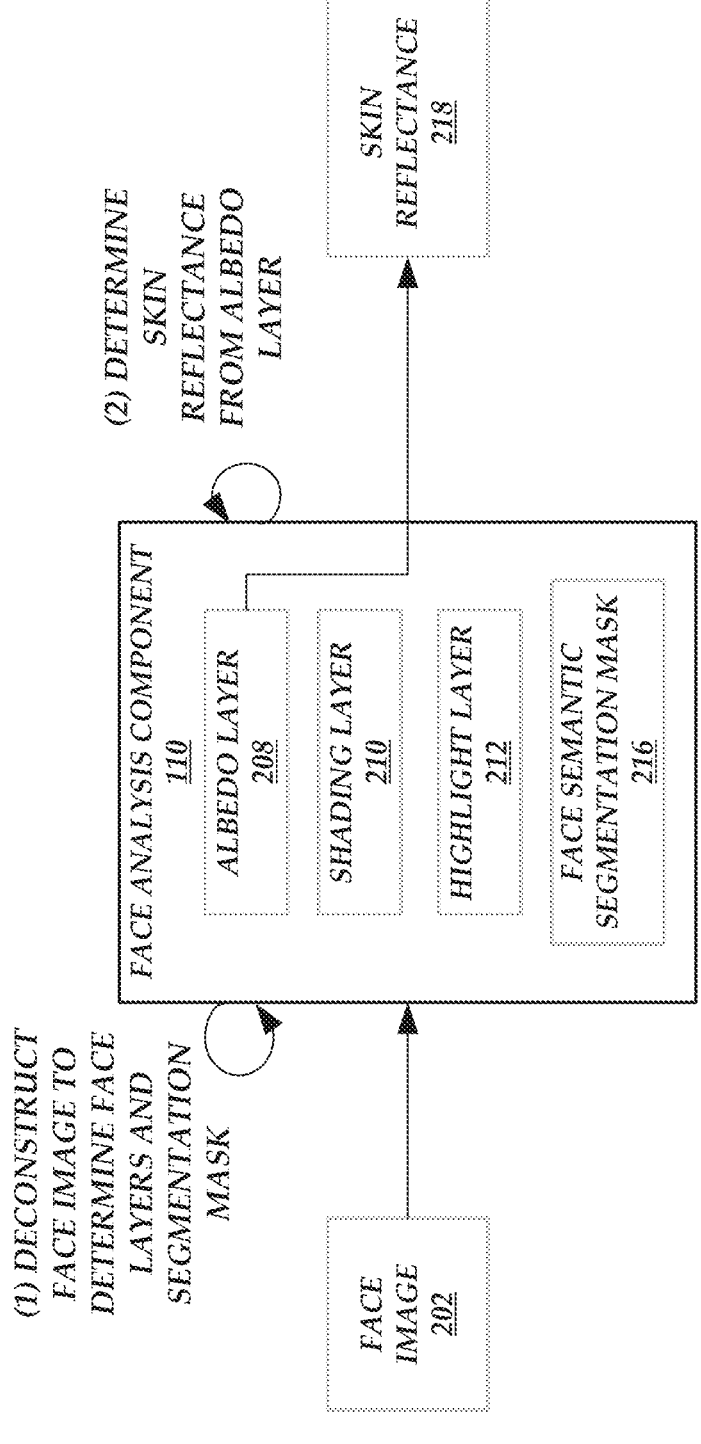
FIG. 4 provides a graphical representation of various steps in a process of determining skin reflectance of a person's face in an image.

FIG. 4 provides a graphical representation 400 of various steps in a process of determining a skin reflectance 218 of a person's face from a face image 202. The processing may happen offline when in static mode or on the fly/dynamically (e.g., in real time or near-real time), depending on the embodiment. At (1), the face analysis component 110 can deconstruct the face image 202 to determine face layers, such as the albedo layer 208, shading layer 210, highlight layer 212, and the face semantic segmentation mask 216. The face semantic segmentation mask 216 may be generated using a face semantic segmentation model trained on a dataset of face semantic segmentation annotated face images. The face semantic segmentation mask 216 depicts the boundaries of the skin on the face depicted in the face image 202. The semantic segmentation mask may indicate boundaries of the face where the selected makeup will be applied. For example, the face semantic segmentation mask 216 may show where the hairline, eyes, and mouth are on the face. The face semantic segmentation mask 216 can be used to depict where the skin is on the face so that makeup will be applied to those areas in the final generated image and not outside of the skin. It will be appreciated that the particular portions or parts of the face (e.g., eyelids, lips, cheeks, forehead, chin, nose, etc.) to be included within the face segmentation mask may depend on the particular type(s) of makeup to be applied in a given instance.

The face analysis component 110 can extract the skin tone, shading, and specular highlight from the face image 202 to get the albedo layer 208, the shading layer 210, and the highlight layer 212. The albedo layer 208 of the face may be an image representing the skin color of the face. For example, the albedo layer 208 may depict the face from the face image 202 with only the skin color (e.g., no shadows or highlights) of the face. The shading layer 210 of the face may be an image representing shadows on the face. For example, the shading layer 210 may depict the face from the face image 202 with only the shadows (e.g., no color or highlights) of the face. The highlight layer 212 may be an image representing areas of highlight on the face. For example, the highlight layer 212 may depict the face from the face image 202 with only the highlights (e.g., no shadows or color) of the face.

To extract the skin tone, shading, and specular highlight from the face image 202, the face analysis component 110 first may implement image processing to remove the shadow and highlight from the face to get the albedo layer 208. The face analysis component 110 may determine the amount of shading by the median of the gray scale values determined from the original image to get the shading layer 210. The face analysis component 110 can set the amount of specular highlight to 1 minus the median of the gray scale image. Second, for each pixel, the face analysis component 110 may use least square optimization with constraints to compute the shading. The highlight layer 212 may be calculated as the face image 202 minus an albedo (e.g., albedo) times the shading.

In addition, in areas of the face image where there is high reflection on the face (e.g., such that part of the face is almost white), the image processing method may not be able to refill the skin color. Therefore, in those cases, the face analysis component 110 may use an inpainting model to fill in the skin color based on the surrounding skin. The inpainting model may use the highlight layer 212 to guide it to appropriately generate the inpainting mask.

At (2), the face analysis component 110 may further determine skin reflectance 218 from the albedo layer 208. The skin reflectance 218 may be estimated using a similar method as that of makeup reflectance described with respect to FIG. 3. The face analysis component 110 may use the color of the skin from the albedo layer 208 in order to estimate the skin reflectance 218. The color blending system 106 can approximate the integral of the reflectance curve with regions of quadrilateral formed by various wavelengths, such as the wavelength at 400 nm, 500 nm, and 600 nm. These three wavelengths may be selected based on the peaks of the human eye sensitivity spectrum. Therefore, the reflectance curve can be approximated using equations from the various wavelength values. For example, denoting the reflectance values at 400 nm, 500 nm, and 600 nm are $R_1$, $R_2$, and $R_3$ (e.g., the various reflectance values) respectively, where the reflectance curve may be approximated by the Formula 3 above.

Each R value may be calculated based on a function of the scattering coefficient, absorption coefficient, and the albedo layer 208. After getting all R values, the color blending system 106 can use linear interpolation for the values in between to get the reflectance curve representing the skin reflectance 218.

Figure 5:
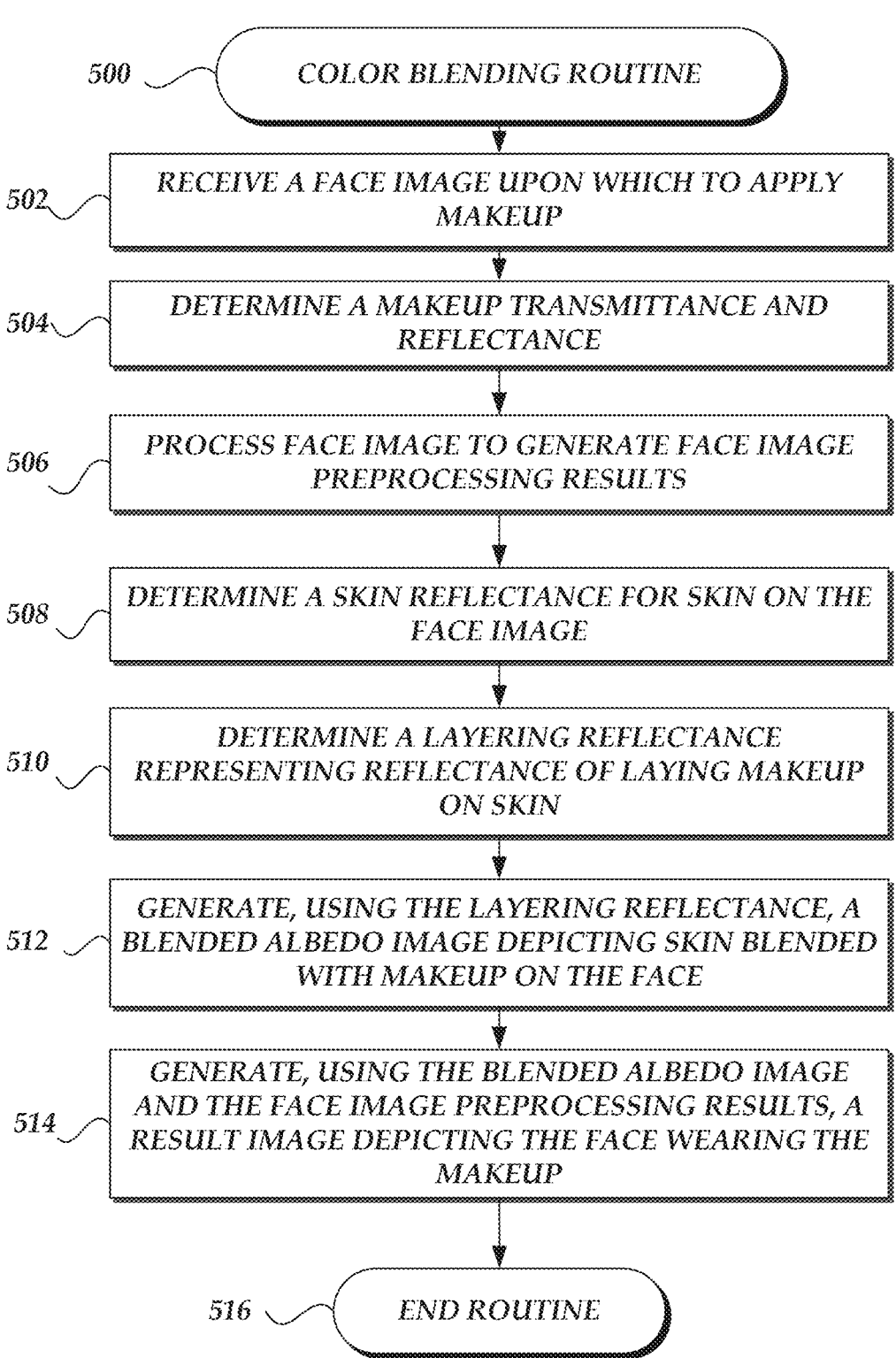
FIG. 5 is a flow chart depicting an example routine for blending the color of a person's face with a makeup color.

FIG. 5 is a flow chart depicting an example routine 500 for blending the color of a person's face with a makeup color. The routine begins at block 502, where the color blending system 106 receives a face image upon which to apply makeup. The face image may depict a front-facing view of a person's face. The face image may be submitted by an end user via a user device, such as through a camera interface or other user interface. For example, an end user may view a user interface on the user's mobile device that has the option to take a picture of the user's face. The end user may then take a picture of his or her face to send to the color blending system 106. However, in one embodiment, the end user may be able to direct the camera towards his or her face and the color blending system 106 can generate the result image without taking a photo of the face. In this scenario, the user can see a live result of the makeup on his or her face. In other embodiments, the face image may be an image selected by the user to approximate the appearance of the user rather than an actual photograph of the user. For example, the user may select an image of a person, from a variety of options, that has similar skin tone and other physical characteristics as the user, or may alter the skin tone or other characteristics to be used by the system in artificially generating a realistic-looking image of a synthetic human face.

At block 504, the color blending system 106 determines a makeup transmittance and reflectance. Makeup transmittance may refer to the amount of light that can be transited through makeup. The makeup transmittance may be represented a wavelength spectrum curve. The color blending system 106 may obtain the makeup transmittance by estimating the transmittance of the makeup from an inputted makeup thickness value. The makeup thickness value may be entered or selected by an end user via a user interface.

However, in another embodiment, the thickness value may be a default value set by the color blending system 106. The makeup transmittance may be estimated based on a function of a scattering coefficient, absorption coefficient, and the thickness value.

The makeup reflectance may represent the amount of light the makeup can reflect indicating how the color of the makeup may be perceived by the human eye. The reflectance may be represented as a wavelength spectrum curve. The reflectance may be estimated using various makeup properties, such as the RGB color and coverage of the makeup. The makeup properties may be obtained from a datastore storing the various properties of the makeup.

The makeup reflectance may be estimated based on an approximation of the reflectance curve, where several values of the reflectance curve are calculated and the color blending system 106 uses linear interpolation to estimate the values in between. The values of the reflectance curve may be estimated using a function of the scattering coefficient, absorption coefficient, and thickness of the makeup.

At block 506, the color blending system 106 may process the face image to generate face image preprocessing results. In order to generate the face image preprocessing results, the color blending system 106 may process the face image to decompose the face image. For example, the system can process the input face image to deconstruct the face in the image into various layers, including a albedo layer, a shading layer, and a highlight layer, along with a semantic segmentation mask. The semantic segmentation mask may indicate boundaries of the face where the selected makeup will be applied. The albedo layer of the face may be an image representing a skin color of the face. The shading layer of the face may be an image representing shadows on the face. The highlight layer may be an image representing areas of highlight on the face.

At block 508, the color blending system 106 may determine a skin reflectance for the skin on the face image. The skin reflectance may represent the amount of light the skin can reflect indicating how the color of the skin may be perceived by the human eye. The reflectance may be represented as a wavelength spectrum curve. The skin reflectance may be estimated using the albedo layer. The skin reflectance may be estimated based on an approximation of the reflectance curve, where several values of the reflectance curve are calculated and the color blending system 106 uses linear interpolation to estimate the values in between. The values of the reflectance curve may be estimated using a function of the scattering coefficient, absorption coefficient, and the skin color (e.g., albedo layer).

At block 510, the color blending system 106 may determine a layering reflectance representing reflectance of the makeup laying on skin. The layering reflectance may be estimated using the makeup transmittance, makeup reflectance, and skin reflectance. In one embodiment, the layering reflectance may be estimated using the Kubelka-Munk theory with Taylor's Expansion. For example, by incorporating the makeup transmittance, makeup reflectance, and skin reflectance together using the Kubelka-Munk theory with Taylor's Expansion, the color blending system 106 can estimate the amount of light the makeup on top of skin can reflect indicating how the color of the makeup on top of the skin may be perceived by the human eye. The layering reflectance may be represented as a wavelength spectrum curve.

At block 512, the color blending system 106 may generate, using the layering reflectance, a blended albedo image depicting skin blended with makeup on the face. The blended albedo image may depict the face from the face image with the color estimated from the layering reflectance. The blended albedo image may not include the highlight and shading from the original face image.

At block 514, the color blending system 106 may generate, using the blended albedo image and the face image preprocessing results, a result image depicting the face wearing the makeup. The color blending system 106 may combine the color of the face from the blended albedo image with the highlight on the face from the highlight layer and the shadow on the face from the shading layer included in the face image preprocessing results. The color blending system 106 may also use the semantic segmentation mask from the face image preprocessing results to incorporate the color from the blended albedo image into the boundaries of the face. The result image can depict the face from the face image as wearing the selected makeup. At block 516, the routine ends.

Figure 6:
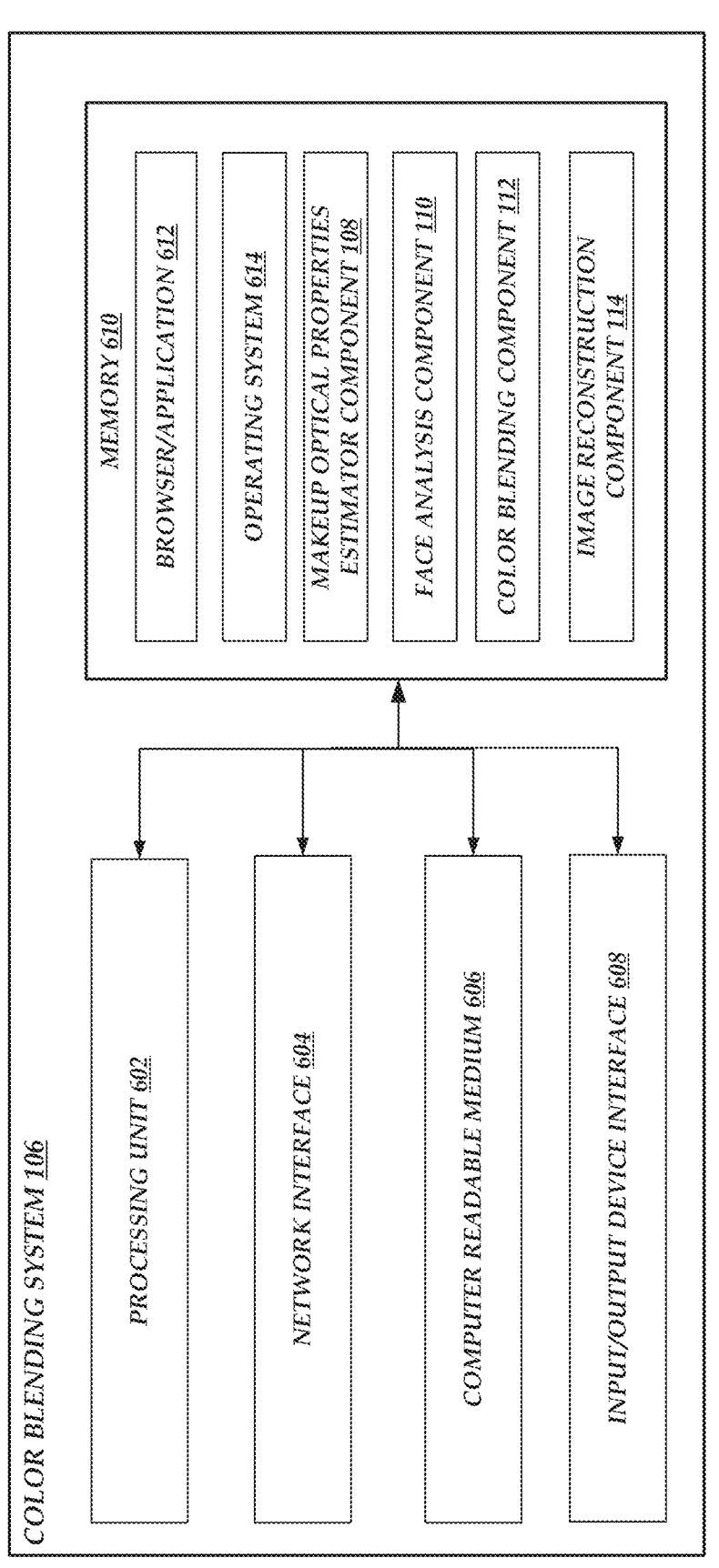
FIG. 6 shows an example computing device that may be used to implement aspects of the present disclosure.

FIG. 6 depicts a general architecture of a computing system implementing the color blending system 106 of FIG. 1. The general architecture of the system depicted in FIG. 6 includes an arrangement of computer hardware and software that may be used to implement aspects of the present disclosure. The hardware may be implemented on physical electronic devices, as discussed in greater detail below. The system may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1. As illustrated, the system includes a processing unit 602, a network interface 604, a computer readable medium drive 606, and an input/output device interface 608, all of which may communicate with one another by way of a communication bus.

The network interface 604 may provide connectivity to one or more networks or computing systems. The processing unit 602 may thus receive information and instructions from other computing systems or services via the network. The processing unit 602 may also communicate to and from memory 610 and further provide output information for an optional display (not shown) via the input/output device interface 608. The input/output device interface 608 may also accept input from an optional input device (not shown).

The memory 610 may contain computer program instructions (grouped as units in some embodiments) that the processing unit 602 executes in order to implement one or more aspects of the present disclosure, along with data used to facilitate or support such execution. While shown in FIG. 6 as a single set of memory 610, memory 610 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 610 may store an operating system 612 that provides computer program instructions for use by the processing unit 602 in the general administration and operation of the color blending system 106. The memory 610 may further include computer program instructions and other information for implementing aspects of the present disclosure. For example, in one embodiment, the memory 610 includes the browser or other application 612, the operating system 614, the makeup optical properties estimator component 108, the face analysis component 110, the color blending component 112, and the image reconstruction component 114. The makeup optical properties estimator component 108, the face analysis component 110, the color blending component 112, and the image reconstruction component 114 may represent code executable to generate images depicting a person wearing a selected makeup.

The system of FIG. 6 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 6 as a color blending system 106, similar components may be utilized in some embodiments to implement other devices shown in the environment of FIG. 1 and described elsewhere herein.

Some or all of the analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application specific circuitry (e.g., ASICs or FPGAs) of the computer system. Where the computer system includes multiple computing devices, these devices may, but need not, be co located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method comprising:
receiving a face image depicting a face upon which to virtually apply makeup;
processing the face image to generate face image preprocessing results;
obtaining a makeup transmittance for the makeup;
determining a makeup reflectance for the makeup indicating how light is reflected off of the makeup;
determining a skin reflectance for the face indicating how light is reflected off of skin on the face;
determining, based on the makeup transmittance, the makeup reflectance, and the skin reflectance, a layering reflectance representing reflectance of the makeup layered on top of the skin on the face;
generating, using the layering reflectance, a blended albedo image depicting the skin blended with the makeup on the face; and
generating, using the blended albedo image and the face image preprocessing results, a result image depicting the face in the face image wearing the makeup.

2. The computer-implemented method of claim 1, wherein the face image preprocessing results comprise a face semantic segmentation mask, an albedo layer, a highlight layer, and a shadow layer.

3. The computer-implemented method of claim 1, wherein obtaining the makeup transmittance comprises estimating a wavelength curve of the transmittance based on a thickness of the makeup and using a scattering coefficient.

4. The computer-implemented method of claim 1, wherein the makeup reflectance is estimated using a scattering coefficient and a thickness of the makeup.

5. The computer-implemented method of claim 1, wherein the layering reflectance is a wavelength function representing a spectrum of light.

6. The computer-implemented method of claim 1, wherein the layering reflectance is determined using a modified Kubelka-Munk theory.

7. The computer-implemented method of claim 6, wherein the modified Kubelka-Munk theory comprises applying an expansion of an integral representing the layering reflectance.

8. The computer-implemented method of claim 1, further comprising:
displaying, in association with a user device that includes a user device camera, the result image, wherein the face image comprises a face image of the user captured in real time by the user device camera.

9. The computer-implemented method of claim 1, further comprising:
causing display, on a user device via a computer application, the result image.

10. The computer-implemented method of claim 1, further comprising:
obtaining a second makeup transmittance for a second makeup;
determining a second makeup reflectance for the second makeup indicating how light is reflected off of the second makeup;

determining, based on the makeup transmittance, the makeup reflectance, the second makeup transmittance, the second makeup reflectance, and the skin reflectance, a second layering reflectance representing reflectance of the makeup and the second makeup layered on top of the skin on the face;

generating, using the second layering reflectance, a second blended albedo image depicting the skin blended with the makeup and the second makeup on the face; and generating, using the second blended albedo image and the face image preprocessing results, a second result image depicting the face in the face image wearing the makeup and the second makeup.

11. A non-transitory computer-readable medium storing specific computer-executable instructions that, when executed by a processor, cause the processor to at least:

receive a face image depicting a face upon which to virtually apply makeup;

process the face image to generate face image preprocessing results;

determine a makeup transmittance for the makeup;

determine a makeup reflectance for the makeup indicating how light is reflected off of the makeup;

determine a skin reflectance for the face indicating how light is reflected off of skin on the face;

determine, based on the makeup transmittance, the makeup reflectance, and the skin reflectance, a layering reflectance representing reflectance of the makeup layered on top of the skin on the face;

generate, using the layering reflectance, a blended albedo image depicting the skin blended with the makeup on the face; and generate, using the blended albedo image and the face image preprocessing results, a result image depicting the face in the face image wearing the makeup.

12. The non-transitory computer-readable medium of claim 11, wherein the face image preprocessing results comprise a face semantic segmentation mask, an albedo layer, a highlight layer, and a shadow layer.

13. The non-transitory computer-readable medium of claim 11, wherein the makeup transmittance and the makeup reflectance are estimated using a thickness of the makeup and a scattering coefficient.

14. The non-transitory computer-readable medium of claim 11, wherein the layering reflectance is determined using a modified Kubelka-Munk theory.

15. The non-transitory computer-readable medium of claim 14, wherein the modified Kubelka-Munk theory comprises applying an expansion of an integral representing the layering reflectance.

16. The non-transitory computer-readable medium of claim 11, wherein the computer-executable instructions, when executed by the processor, further cause the processor to:

obtain a second makeup transmittance for a second makeup;

determine a second makeup reflectance for the second makeup indicating how light is reflected off of the second makeup;

determine, based on the makeup transmittance, the makeup reflectance, the second makeup transmittance, the second makeup reflectance, and the skin reflectance, a second layering reflectance representing reflectance of the makeup and the second makeup layered on top of the skin on the face;

generate, using the second layering reflectance, a second blended albedo image depicting the skin blended with the makeup and the second makeup on the face; and generate, using the second blended albedo image and the face image preprocessing results, a second result image depicting the face in the face image wearing the makeup and the second makeup.

17. A system comprising:

one or more processors; and a memory that stores computer-executable instructions, wherein the computer-executable instructions, when executed, cause the one or more processors to:

receive a face image depicting a face upon which to virtually apply makeup;

process the face image to generate face image preprocessing results;

determine a makeup transmittance for the makeup;

determine a makeup reflectance for the makeup indicating how light is reflected off of the makeup;

determine a skin reflectance for the face indicating how light is reflected off of skin on the face;

determine, based on the makeup transmittance, the makeup reflectance, and the skin reflectance, a layering reflectance representing reflectance of the makeup layered on top of the skin on the face;

generate, using the layering reflectance, a blended albedo image depicting the skin blended with the makeup on the face; and generate, using the blended albedo image and the face image preprocessing results, a result image depicting the face in the face image wearing the makeup.

18. The system of claim 17, wherein the face image preprocessing results comprise a face semantic segmentation mask, an albedo layer, a highlight layer, and a shadow layer.

19. The system of claim 17, wherein the makeup transmittance and the makeup reflectance are estimated using a thickness of the makeup and a scattering coefficient.

20. The system of claim 17, wherein the layering reflectance is determined using a modified Kubelka-Munk theory.

* * * * *